B. J. Greely,
Ash Sifter.
No. 91,329.   Patented June 15, 1869.
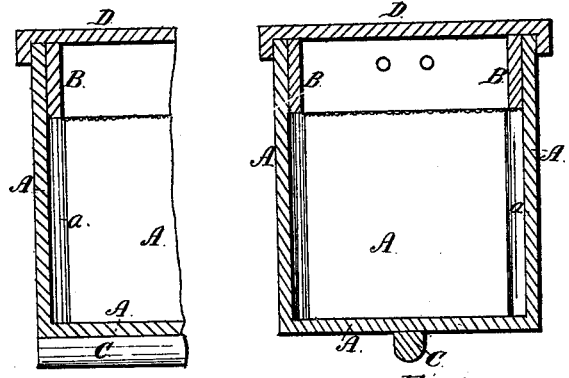
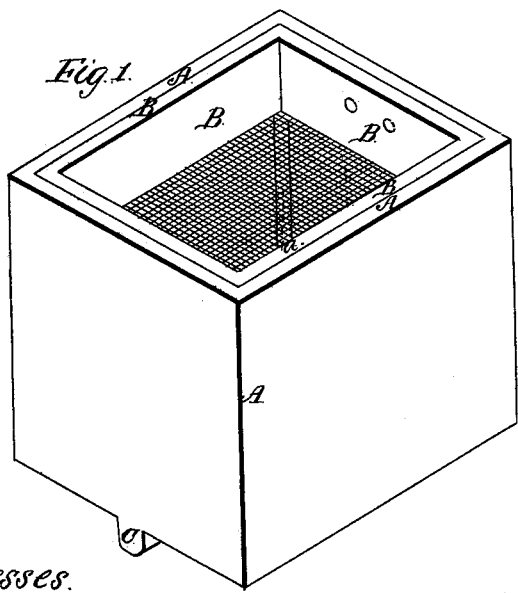

United States Patent Office.

BENJAMIN J. GREELY, OF BOSTON, MASSACHUSETTS.

*Letters Patent No. 91,329, dated June 15, 1869.*

ASH-SIFTER.

The Schedule referred to in these Letters Patent and making part of the same.

*To all whom it may concern:*

Be it known that I, BENJAMIN J. GREELY, of Boston, in the county of Suffolk, and State of Massachusetts, have invented a new and improved "Ash-Sifter;" and I do hereby declare that the following is a full, clear, and exact description of the same, reference being had to the accompanying drawings, making a part of this specification, in which—

Figure 1 is a perspective view of my sifter, with the cover removed;

Figure 2 is a cross-section of the same; and

Figure 3, a portion of a longitudinal section.

My ash-sifter is composed of a box, A, of any convenient size, provided with a narrow strip, C, across its bottom, so that it may be rocked back and forth, and a removable sieve, B.

It is obvious that two short pieces may be used in place of the strip C.

Its operation is as follows:

The sieve B, having been put into its place, where it rests on shoulders *a a*, the material to be sifted is placed upon it, and the cover D put upon the box, if desired, to prevent the escape of dust.

The box is then thrown back and forth by the foot of the operator, the jarring motion caused thereby operating to throw the cinders, when ashes are sifted, from side to side of the sieve, knocking off the fine ashes, and loosening up the mass so as to allow the fine parts to fall through the meshes.

When the sifting is completed the sieve is removed, and the box serves as a receptacle for the ashes, and a vessel in which to carry them to the place where they are to be emptied.

The advantages of my sifter are its perfect simplicity, the impossibility of its getting out of order, the cheapness of its construction, the ease with which it is worked, and the fact that it is an ash-sifter and receptacle for ashes combined.

The jarring motion is also regarded as an improvement on the sifting motions commonly used, when ashes are to be sifted.

I disclaim all the parts of my sifter, when taken separately, as my invention consists entirely in their arrangement; but What I do claim as my invention, and desire to secure by Letters Patent, is—

The ash-sifter herein described, composed of the box A, removable sieve B, and piece C, when constructed and arranged together substantially as described.

B. J. GREELY.

Witnesses:
J. E. MAYNADIER,
CHAS. F. SLEEPER.